US010586528B2

(12) United States Patent
Manuvinakurike et al.

(10) Patent No.: US 10,586,528 B2
(45) Date of Patent: Mar. 10, 2020

(54) DOMAIN-SPECIFIC SPEECH RECOGNIZERS IN A DIGITAL MEDIUM ENVIRONMENT

(71) Applicant: Adobe Inc., San Jose, CA (US)

(72) Inventors: Ramesh Radhakrishna Manuvinakurike, Los Angeles, CA (US); Trung Huu Bui, San Jose, CA (US); Robert S. N. Dates, Raleigh, NC (US)

(73) Assignee: Adobe Inc., San Jose, CA (US)

( * ) Notice: Subject to any disclaimer, the term of this patent is extended or adjusted under 35 U.S.C. 154(b) by 37 days.

(21) Appl. No.: 15/423,429

(22) Filed: Feb. 2, 2017

(65) Prior Publication Data

US 2018/0218728 A1 Aug. 2, 2018

(51) Int. Cl.
| | |
|---|---|
| *G10L 15/06* | (2013.01) |
| *G10L 15/197* | (2013.01) |
| *G10L 15/02* | (2006.01) |
| *G10L 15/16* | (2006.01) |
| *G10L 15/22* | (2006.01) |
| *G06Q 10/10* | (2012.01) |

(52) U.S. Cl.
CPC ............ *G10L 15/063* (2013.01); *G06Q 10/10* (2013.01); *G10L 15/197* (2013.01); *G10L 2015/0638* (2013.01)

(58) Field of Classification Search
CPC ....... G10L 15/063; G10L 15/22; G10L 15/02; G10L 15/197; G10L 15/16; G10L 2015/0638

USPC .......................................................... 704/232
See application file for complete search history.

(56) References Cited

U.S. PATENT DOCUMENTS

| | | | |
|---|---|---|---|
| 9,279,983 B1* | 3/2016 | Davis .................... | G02B 27/01 |
| 9,361,887 B1* | 6/2016 | Braga .................... | H04W 4/21 |
| 9,448,993 B1* | 9/2016 | Braga .................... | G10L 15/26 |
| 2007/0156392 A1* | 7/2007 | Balchandran .......... | G06F 17/27 704/9 |
| 2009/0177477 A1* | 7/2009 | Nenov .................. | A61B 5/0002 704/275 |
| 2011/0296374 A1* | 12/2011 | Wu ..................... | G06F 17/2715 717/104 |

(Continued)

*Primary Examiner* — Edwin S Leland, III
(74) *Attorney, Agent, or Firm* — SBMC

(57) ABSTRACT

Domain-specific speech recognizer generation with crowd sourcing is described. The domain-specific speech recognizers are generated for voice user interfaces (VUIs) configured to replace or supplement application interfaces. In accordance with the described techniques, the speech recognizers are generated for a respective such application interface and are domain-specific because they are each generated based on language data that corresponds to the respective application interface. This domain-specific language data is used to build a domain-specific language model. The domain-specific language data is also used to collect acoustic data for building an acoustic model. In particular, the domain-specific language data is used to generate user interfaces that prompt crowd-sourcing participants to say selected words represented by the language data for recording. The recordings of these selected words are then used to build the acoustic model. The domain-specific speech recognizers are generated by combining a respective domain-specific language model and crowd-sourced acoustic model.

20 Claims, 8 Drawing Sheets

(56) References Cited

U.S. PATENT DOCUMENTS

| | | | | |
|---|---|---|---|---|
| 2012/0029910 A1* | 2/2012 | Medlock | ............... | G06F 3/0237 |
| | | | | 704/9 |
| 2012/0109651 A1* | 5/2012 | Chen | ................... | G06F 16/313 |
| | | | | 704/240 |
| 2012/0323557 A1* | 12/2012 | Koll | .................... | G10L 15/063 |
| | | | | 704/8 |
| 2015/0301795 A1* | 10/2015 | Lebrun | ................ | G06F 17/279 |
| | | | | 704/9 |
| 2015/0371422 A1* | 12/2015 | Kokemohr | ............. | G06T 11/60 |
| | | | | 382/311 |
| 2016/0336006 A1* | 11/2016 | Levit | .................... | G10L 15/063 |
| 2016/0378080 A1* | 12/2016 | Uppala | ................... | G10L 15/22 |
| | | | | 700/275 |
| 2017/0133007 A1* | 5/2017 | Drewes | ................ | G10L 15/063 |
| 2017/0160813 A1* | 6/2017 | Divakaran | ............. | G06F 3/017 |
| 2018/0218728 A1* | 8/2018 | Manuvinakurike | ... | G10L 15/063 |
| 2019/0088237 A1* | 3/2019 | Depietro, III | ............ | G10H 1/00 |

* cited by examiner

DOMAIN-SPECIFIC SPEECH RECOGNIZERS IN A DIGITAL MEDIUM ENVIRONMENT

BACKGROUND

For many years, users interacted with computing devices using just keyboards and displays—users input information, such as commands, to the devices via keyboards and the devices output information to users visually via the displays, largely in the form of text and limited graphics. The advent of the computing mouse enabled users to provide a different type of input to computers. Namely, the mouse allowed users to quickly and intuitively change a position of a pointer within a graphical user interface (GUI) and to 'click' buttons of the mouse once or in rapid succession to provide additional input relative to the pointer position. To accommodate widespread adoption of the mouse, GUIs also changed. For instance, GUIs changed to include objects of varying size capable of being displayed at different positions and relative to which a click or clicks initiates some action, e.g., to launch an application, make a selection within an application, cause display of another GUI component such as a menu, close a GUI component such as a window, and so on.

Like computing technologies generally, the development of user interfaces continues to evolve. There has been much work, for example, developing "natural user interfaces" (NUIs). Broadly speaking, NUIs are systems that enable user-computer interactions through intuitive actions related to natural, everyday human behavior. Some examples of NUIs include touch interfaces that let users interact with controls and applications more intuitively than cursor based interfaces because the touch interfaces are more direct, gesture recognition systems that track motions of users and translate those motions into instructions, gaze-tracking interfaces that allow users to guide a system through eye movements, and voice user interfaces (VUIs) that allow users to interact with a system through spoken commands. With regard to VUIs in particular, many conventionally configured speech recognition techniques, that are used to implement VUIs, fail to accurately recognize the words spoken by users. This inaccuracy can lead to confusion regarding the words actually spoken (e.g., in cases where a user is shown text indicative of a speaking user's words) and ultimately user frustration with VUIs. Due to such frustration, users may simply avoid interacting with systems via VUIs.

SUMMARY

To overcome these problems, domain-specific speech recognizers are generated in a digital medium environment. The domain-specific speech recognizers are generated for voice user interfaces (VUIs) configured to replace or supplement application interfaces. In accordance with the described techniques, the speech recognizers are generated for a respective application interface that is to be replaced or supplemented. The speech recognizers are domain-specific because they are each generated based on language data that corresponds to the respective application interface. This language data may be collected for the respective application interface in different ways, such as from application logs in the case of application interfaces that take text-based inputs or through user-based collection for application interfaces that take non-textual inputs (e.g., mouse clicks, touch input). In any case, the domain-specific language data is used to build a domain-specific language model.

The domain-specific language data is also used to collect acoustic data for building an acoustic model. In particular, the domain-specific language data is used to generate user interfaces that prompt crowd-sourcing participants to say selected words represented by the language data for recording. The recordings of these selected words may then be used to build the acoustic model. The domain-specific speech recognizers are generated from a respective domain-specific language model and a respective crowd-sourced acoustic model. In particular, the generation may combine these models by fusing them into a unified representation of a search space that can be searched to recognize the words spoken to a corresponding VUI. Using the domain-specific speech recognizers improves the accuracy of speech recognition for the domain in which the speech recognizers are deployed. This is because the speech recognizers are generated from words and phrases specific to the domain. Consequently, the speech recognizers can be particularly suited to recognize the words and phrases that are actually used for user-computer interactions within the domain.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
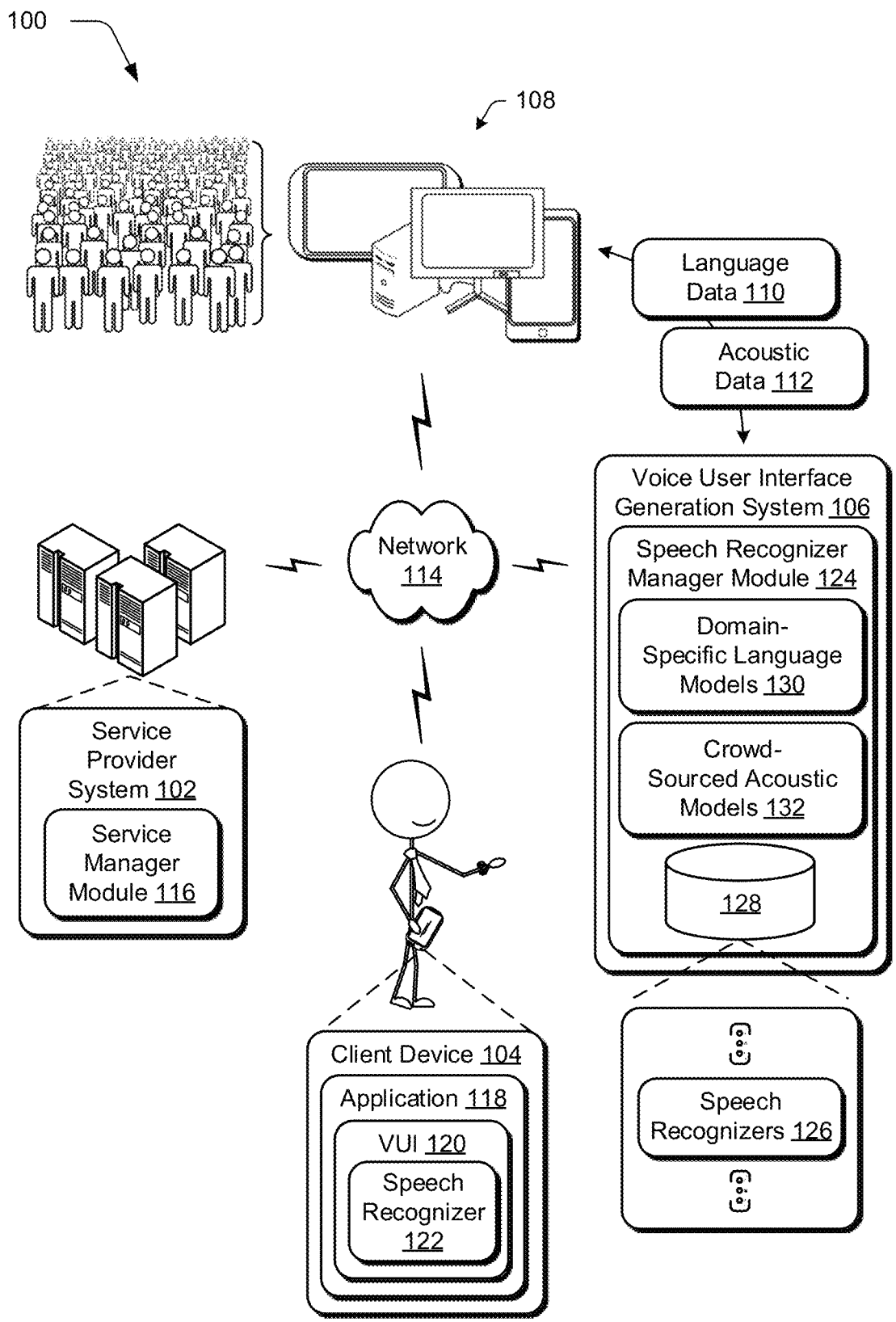
FIG. 1 is an illustration of an environment in an example implementation that is operable to employ techniques described herein.

Voice user interfaces (VUIs) allow users to interact with computing devices through spoken commands. However, many conventionally configured VUIs are implemented using speech recognition techniques that fail to accurately recognize the words spoken by users. This inaccuracy can lead to confusion regarding the words actually spoken (e.g., in cases where a user is shown text indicative of a speaking user's words) and ultimately user frustration with VUIs. Due to such frustration, users may simply avoid interacting with systems via VUIs.

Domain-specific speech recognizers generated in a digital medium environment are described. In general, the domain-specific speech recognizers are each generated using language data that is specific to an interface of an application. In particular, the language data is specific to an application interface that is to be replaced by or supplemented with a VUI configured with a domain-specific speech recognizer. Part of generating the domain-specific speech recognizer involves collecting language data that is specific to the interface that the VUI will replace or supplement. As described in more detail below, interface-specific language data may be collected in a variety of different ways.

For instance, language data can be collected for a text-based interface component (e.g., a text-input box) from an application log. Such application logs may save text entries that are entered into the text-based interface component to drive functionality of a service or application. In the context of a search engine, for example, text corresponding to a search query may be entered into a text-input box to perform a search. Such text entries (e.g., queries) can be extracted from the application logs and used as the language data for generating a domain-specific speech recognizer.

Many interfaces are not driven by text input, however. Instead, many interfaces enable user interaction through selection inputs such as clicks (of a mouse), taps (of fingers), and so on. Language data for these and other non-textual application interfaces may be obtained in other ways, an example of which is described in more detail below. To collect language data for a non-textual interface, an application log may be parsed to determine non-textual inputs received and states of an application or information presented by the application in connection with the non-textual inputs. Consider an image editing application, for example. An application log for the image editing application may indicate that a user provided input to crop an image. The application log may also indicate a state of the image before and after receiving the cropping input. Once determined, before and after states of the application or information (e.g., the image in the example above) can be presented to users with a prompt, such as, "in your own words describe how you would achieve the after state from the before state." The responses of the users can then be converted to text and used as the language data that is specific to the interface.

The techniques described herein build a language model from this domain-specific language data. To do so, the domain-specific language data is analyzed to learn (e.g., with machine learning techniques) sequences of words used in the domain. The language model is built based on the learning. In accordance with the described techniques, the language model is capable of predicting a sequence of words. For instance, given a current word or preceding part of a phrase, the language model can predict a next most likely word to be used (e.g., spoken), the probability of a given word to be next used, and so on. To build a domain-specific speech recognizer, a language model built using domain-specific language data is used along with an acoustic model.

In accordance with the techniques described herein, the acoustic model may be built using crowd-sourced acoustic data. In particular, the crowd-sourced acoustic data used for a particular interface is captured for terms and phrases represented by the language data associated with the particular interface. To do so, multiple users participating in a crowd-sourcing effort are presented domain-specific terms or phrases, e.g., via a speech collection graphical user interface. These users may then say the term or phrase out loud, which can be recorded by microphones of the users' devices. The recordings of the presented terms and phrases can be digitized to form the acoustic data. Using the acoustic data that is collected for a particular domain from the multiple users, a crowd-sourced acoustic model is built. To do so, the acoustic data is analyzed to break down the recordings of the spoken terms and phrases into basic sounds. Further, these basic sounds are mapped to phonemes. From this, a mapping of domain-specific terms and phrases to a list of phonemes can be determined. This mapping can be learned using machine learning (e.g., deep learning) and an acoustic model built based on the learning. The acoustic model may be built as a deep neural network (DNN), for instance. In any case, the acoustic model is built from the crowd-sourced acoustic data and is capable of identifying words from a series of spoken sounds.

The domain-specific speech recognizers are generated by fusing a respective domain-specific language model with a respective crowd-sourced acoustic model into a unified representation of the search space. In general, this fusing combines the ability of the domain-specific language model to predict sequences of words in the respective domain with the ability of the crowd-sourced acoustic model to map combinations of sounds to particular words of the respective domain. In particular, the combination of these models enables the speech recognizers to be used to calculate probabilities that a spoken phrase corresponds to different sequences of words of a respective domain. The different sequences of words can then be ranked according to the probabilities, such that a sequence of words of the domain with a highest calculated probability (of corresponding to the spoken phrase) is assigned to the spoken phrase. The techniques described herein improve the accuracy of speech recognizers. This is because the speech recognizers are generated from words and phrases that are specific to a domain. Consequently, the speech recognizers are particularly suited to recognize the words and phrases that are actually used for user-computer interactions within the domain.

Term Descriptions

As used herein, the terms "domain-specific" and "specific to a domain" refer to a characteristic of data (e.g., language, acoustic, model) to be collected from or generated based on the data that is collected from a particular application or from a particular interface of an application. By way of example, for an image search application, domain-specific language data may correspond to text entered via a searching component of the image search application to initiate an image search. Further, a domain-specific language model for the image search application may correspond to a language model built from the text entered via the searching component. In an image editing application example, domain-specific language data may correspond to text derived from non-textual user input that drives the image editing application, e.g., language data derived from clicks or taps to perform image editing operations. Further, a domain-specific language model for the image editing application may correspond to a language model that is built using the text derived from the non-textual user input. Accordingly, domain-specific data corresponds to one of a plurality of domains. The plurality of domains may include a variety of different domains without departing from the spirit or scope of the techniques described herein.

As used herein, an "interface" refers to a system that enables user-computer interactions. As discussed above, graphical user interfaces (GUIs) correspond to interfaces displayed via displays of computing devices that provide visual feedback to users. Interfaces can also include peripheral devices that enable users to provide input to computing devices, such as computing mouse, keyboards, stylus, and so on. Natural user interfaces (NUIs), including touch screens and voice user interfaces (VUIs), are further examples of interfaces that enable user-computer interactions.

An "interface component" refers to a particular component of an interface, graphical or otherwise. By way of example, an interface component of a GUI may correspond to a menu, a dropdown, a text-input box, a radio button, and so forth.

As used herein, "language data" refers digital information that represents text, such as text of a query entered into a text-input box. "Acoustic data" refers to a digital representation of an acoustic signal part of speech. An audio file, such as an .mp3-formatted file, is one example of acoustic data.

As used herein, a "phoneme" refers to a sound or group of different sounds perceived to have a same function by speakers of the language or dialect in question. An example is the English phoneme /k/, which occurs in words such as "cat," "kit," "scat," and "skit." Although the "c/k" sounds in these words are not identical in most English dialects (e.g., the "c/k" sound in "kit" may be aspirated while the "c/k" sound in "skill" is unaspirated), these different sounds are nonetheless considered to belong to the same phoneme. This is because if a speaker were to use one instead of the other when pronouncing a word, a meaning of the word would not change. Other sounds, however, would change the meaning of words if substituted. For instance, if the sound [t] were substituted for the "c/k" sound in "skill" the different word "still" would result. As such, the [t] sound is considered a different phoneme in English than /k/. Different languages or regions of the world may perceive different sounds to have different functions, however. For instance, in some languages or regions the aspirated "c/k" sound and the unaspirated "c/k" sound may have different functions, and thus may correspond to different phonemes. Accordingly, different sets of phonemes may be associated with different languages and regions of the world. Given these differences in phonemes, crowd-sourced acoustic models may be derived for particular languages and regions from acoustic data that is collected from crowd-sourcing participants corresponding to those languages and regions.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ domain-specific speech recognizers described herein. The illustrated environment 100 includes a service provider system 102, client device 104, voice user interface generation system 106 (VUI generation system 106), and sources 108 of language data 110 and acoustic data 112 that are communicatively coupled, one to another, via a network 114.

Computing devices that are usable to implement the service provider system 102, client device 104, VUI generation system 106, and sources 108 may be configured in a variety of ways. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The service provider system 102 is illustrated as including a service manager module 116 that is representative of functionality to provide services accessible via the network 114 that are usable to make products or services available to consumers. The service manager module 116, for instance, may expose a website or other functionality that is accessible via the network 114 by an application 118 of the client device 104. The application 118, for instance, may be configured as a browser, network-enabled application, and so on that obtains data from the service provider system 102 via the network 114. This data can be employed by the application 118 to enable a user of the client device 104 to communicate with the service provider system 102 to perform a variety of actions in connection with the service provider system 102, such as to submit a search query when the service provider system 102 provides a search engine.

To enable user interaction, the application 118 includes voice user interface 120 (VUI 120). Although not shown, the application 118 and/or the client device 104 may be configured with a variety of other types of interfaces that allow a user to interact with the application, such as keyboard and/or mouse interfaces, touch interfaces, gesture recognition interfaces, gaze-tracking interfaces, and so on. The VUI 120 is illustrated with speech recognizer 122. In general, the speech recognizer 122 represents functionality to identify spoken words and phrases from a received audio signal (e.g., spoken into a microphone, recorded in an audio file, and so forth) and convert them into a computer-readable format (e.g., text) for interaction. In accordance with the techniques described herein, the speech recognizer 122 is built for the application 118 or for a particular interface of the application 118. In other words, the speech recognizer 122 is "domain-specific" to the application 118.

By "domain-specific," it is meant that the speech recognizer 122 is trained using language and spoken data that is specific to the application 118 or specific to the particular interface of the application 118 for which a VUI 120 is utilized. By way of example, if the VUI 120 replaces a previously text-based component used to search for images, the speech recognizer 122 is trained using language and spoken data that is pertinent to image searching. Consider another example in which the VUI 120 is used for image editing operations (e.g., cropping, filtering, zooming) in accordance with one or more implementations. In this other example, the speech recognizer 122 is trained using language and spoken data that is pertinent to image editing.

In order to generate domain-specific speech recognizers for VUIs, the service provider system 102 may employ a VUI generation system 106. Although functionality of the VUI generation system 106 is illustrated as separate from the service provider system 102, this functionality may also be incorporated as part of the service provider system 102, further divided among other entities, and so forth. The VUI generation system 106 includes a speech recognizer manager module 124 that is implemented at least partially in hardware of a computing device to provide speech recognizers 126, which are illustrated stored in storage 128 and which are used for implementing voice user interfaces (VUIs). The speech recognizer 122, for instance, may correspond to one of the speech recognizers 126 generated by the speech recognizer manager module 124—it may be generated by the speech recognizer manager module 124 to implement the VUI 120 specifically for the application 118.

Like the speech recognizer 122, the speech recognizers 126 represent functionality to identify spoken words and phrases and convert them into a computer-readable format for interaction. The speech recognizer manager module 124 may generate the speech recognizers 126 from domain-specific language models 130 (DS language models 130) and crowd-sourced acoustic models 132 (CS acoustic models 132) using one or more cohesion techniques. The speech recognizer manager module 124 also represents functionality to build the DS language models 130 and the CS acoustic models 132 from the language data 110 and the acoustic data 112, respectively.

In general, each of the DS language models 130 are built from the language data 110 that is collected specifically for the domain in which the DS language model will be utilized. By way of example, a DS language model 130 for an image search interface is built from the language data 110 collected for image searching. This language data may be collected from text queries entered by users into a text-input box of an image search service, an example of which is described in further detail in relation to FIG. 3. In general, the DS language models 130 are capable of predicting for a respective domain a next word in a sequence of words, attaching a probability to a given word that it is next in a sequence of words, and so on.

The CS acoustic models 132 represent the acoustic-signal part of speech and each correspond to one of the DS language models 130. In particular, the CS acoustic models 132 are mappings of phonemes to the domain-specific list of words represented by the respective DS language model 130. Broadly speaking, a "phoneme" is a sound or group of different sounds perceived to have a same function by speakers of the language or dialect in question. An example is the English phoneme /k/, which occurs in words such as "cat," "kit," "scat," and "skit." Although the "c/k" sounds in these words are not identical in most English dialects (e.g., the "c/k" sound in "kit" may be aspirated while the "c/k" sound in "skill" is unaspirated), these different sounds are nonetheless considered to belong to the same phoneme. This is because if a speaker were to use one instead of the other when pronouncing a word, a meaning of the word would not change. Other sounds, however, would change the words in meaning if substituted. For instance, if the sound [t] were substituted for the "c/k" sound in "skill" the different word "still" would result. As such, the [t] sound is considered a different phoneme in English than /k/. Different languages or regions of the world may perceive different sounds to have different functions, however. For instance, in some languages or regions the aspirated "c/k" sound and the unaspirated "c/k" sound may have different functions, and thus may correspond to different phonemes. Accordingly, different sets of phonemes may be associated with different languages and regions of the world in accordance with one or more implementations.

In any case, CS acoustic models 132 are built using the acoustic data 112, which may be both crowd sourced from the sources 108 and domain-specific. To collect the acoustic data 112 so that it is domain-specific, a phrase that is specific to a domain may be presented to users (e.g., of the sources 108), one or more of the users may speak the phrase, the spoken phrase can be recorded (e.g., via a microphone), and the recording converted into the acoustic data 112. To present users with phrases specific to a domain, the language data 110 collected for that domain may be used. Consider again the example in which a VUI and a speech recognizer are generated for an image searching application. Consider further that the language data 110 collected corresponds to search queries entered via a text-input box for images. In this image-searching example, users may be presented with phrases that correspond to the search queries entered for the images. For example, the phrase "sports car" may have been entered via a text box of an image searching application to find images of sports cars—as indicated by the language data 110. Accordingly, one or more of the users contributing to crowd-sourcing the acoustic data 112 may be presented the text "sports car" via a graphical user interface. These users may then say "sports car," which may be recorded by a microphone and digitized to form the acoustic data 112. This particular portion of the acoustic data 112 may be associated with text of the phrase presented (e.g., "sports car"), such as by using metadata or through some other identifier capable of tying the phrase presented to the acoustic data 112. In any case, the CS acoustic models 132 may be domain-specific because the phrases presented to the users for crowd-sourcing are taken from the language data 110 collected for the specific domain. Thus, like the DS language models 130, the CS acoustic models 132 may also be built on a per domain basis.

Having considered an example environment, consider now a discussion of some example details of the techniques for identifying key terms related to an entity in accordance with one or more implementations.

Domain-Specific Speech Recognizer Generation with Crowd Sourcing

Figure 2:
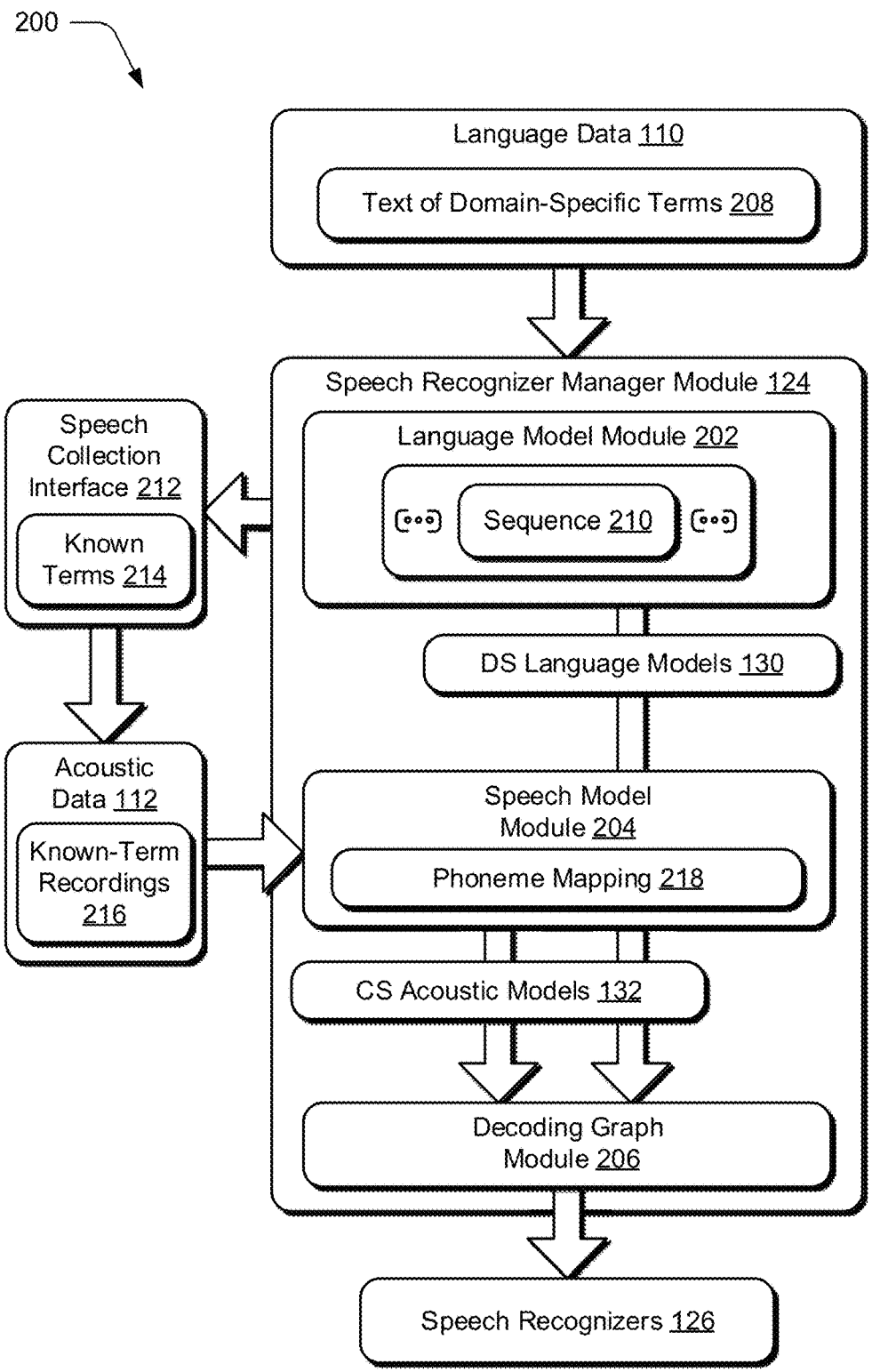
FIG. 2 depicts an example implementation in which a voice user interface generation system of FIG. 1 uses domain-specific language data and crowd-sourced acoustic data to generate a speech recognizer.
Figure 3:
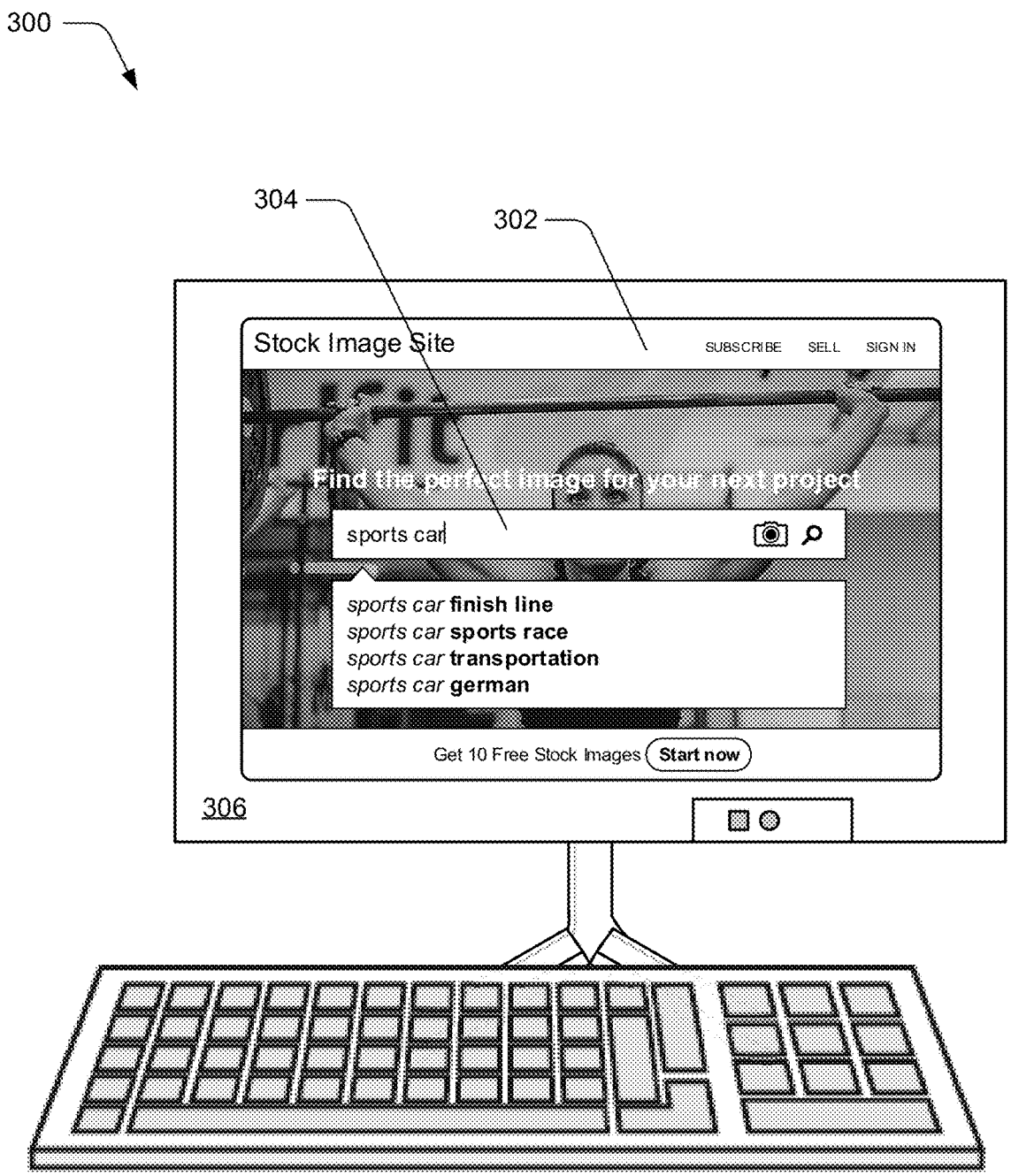
FIG. 3 depicts an example in which domain-specific language data is collected for an application interface controlled by text-based input.
Figure 4:
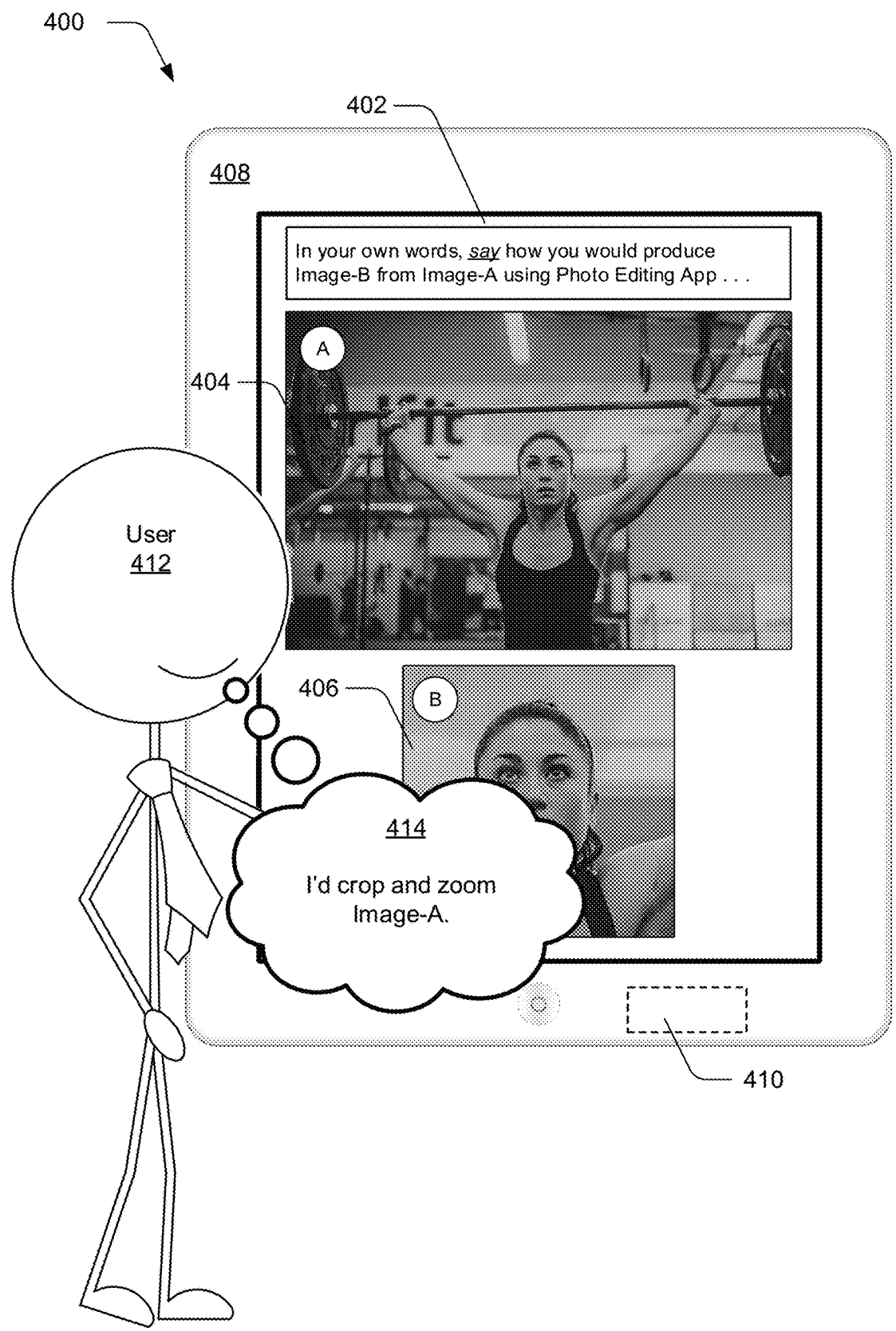
FIG. 4 depicts an example in which domain-specific language data is collected for an application interface controlled substantially by non-textual input.

FIG. 2 depicts a system 200 in an example implementation in which the voice user interface generation system 106 of FIG. 1 uses domain-specific language data and crowd-sourced acoustic data to generate a speech recognizer. FIG. 3 depicts an example in which the domain-specific language data is collected for an application interface controlled by text-based input and FIG. 4 depicts an example in which the domain-specific language data is collected for an application interface controlled by non-textual input.

The illustrated system 200 is depicted with the speech recognizer manager module 124 of the voice user interface generation system 106 (VUI generation system 106) of FIG. 1. In this example, the speech recognizer manager module 124 includes language model module 202, speech model module 204, and decoding graph module 206. In general, the language model module 202 represents functionality of the speech recognizer manager module 124 to generate the domain-specific language models 130 (DS language models 130), the speech model module 204 represents functionality of the speech recognizer manager module 124 to generate the crowd-sourced acoustic models 132 (CS acoustic models 132), and the decoding graph module 206 represents functionality of the speech recognizer manager module 124 to generate the speech recognizers 126.

The speech recognizer manager module 124 is shown obtaining the language data 110 as input. In the example, the language data includes text of domain-specific terms 208. The text of domain-specific terms 208 may be collected as described in more detail in relation to FIGS. 3 and 4. Regardless of how collected, the text of domain-specific terms 208 represents words and phrases that are collected for a specific domain, such as phrases used to control a single application or a single application interface. In the example discussed further above and below, where a speech recognizer is generated for an interface used to search for images, the text of domain-specific terms 208 may correspond to text queries entered to find particular images. Such text queries may serve as input for application controls such that with a text string comprising a search query, an image search engine may be able to initiate a search for images.

In a different example, where a speech recognizer is generated for an interface of an image editing application, the text of domain-specific terms 208 may correspond to commands for initiating image editing operations, e.g., "crop the image," "zoom the image," "apply a black and white filter," and so on. These text phrases may correspond to commands that are usable to control applications. To this extent, given a text string comprising a command, an image editing application may be able to perform corresponding editing operations on an image. It should be appreciated that the image searching and image editing applications are mere examples and that the text of domain-specific terms 208 may correspond to a variety of other domains without departing from the spirit or scope of the techniques described herein.

Regardless of the particular domain, the language model module 202 is configured to build the DS language models 130 from the language data 110. To do so, the language model module 202 may analyze the text of domain-specific terms 208 to determine sequences of words and phrases for a domain. Sequence 210 represents a sequence of words that is determined through an analysis of the text of domain-specific terms 208. The sequence 210 may correspond to arrangements words that are likely to be spoken for a given domain. In addition or alternately, the sequence 210 may represent a determination for a domain of a most likely next word given a current word. Still further, the sequence 20 may represent a probability of words as being the next most likely word used given the current word. For a given domain, the language model module 202 may determine a plurality of sequences from the text of domain-specific terms 208. The language model module 202 builds the DS language models 130 based on the determined sequences. In particular, a language model built for a specific domain is usable to determine a next most likely word to be spoken to an interface given a current word (or preceding part of a phrase), determine a probability of a word to be the next word spoken given the current word (or preceding part of the phrase), and so forth. The language model module 202 may provide the DS language models 130 to the decoding graph module 206 to generate the speech recognizers 126.

FIG. 2 also includes speech collection interface 212, which represents an interface communicated to the sources 108 for obtaining the acoustic data 112 using one or more crowd-sourcing techniques. In particular, the speech collection interface 212 may be displayed to a user via a source device and include known terms 214. The speech collection interface 212 may instruct a user that is a crowd-sourcing participant to vocalize the known terms 214 displayed. A microphone or other recording apparatus can be employed to record the vocalized sounds corresponding to the known terms 214. The speech collection interface 212 may be configured to display one set of the known terms 214 at a time, prompting a user to say the displayed set of known terms and select a next option once the displayed terms are said. The speech collection interface 212 is further configured to display a next set of the known terms 214 based on selection of the next option. Each set of the known terms 214 may be specific to a particular domain and associated with the particular domain using identifying information, such as metadata. This information may also be used to associate the recorded words and phrases with the known terms 214.

The acoustic data 112 represents the data produced by the sources 108 by digitizing sounds spoken by the users for the known terms 214. In particular, known-term recordings 216 represent recordings of user-spoken sounds (e.g., spoken words and phrases) that correspond to the known terms 214. For instance, one of the known-term recordings 216 may correspond to one set of the known terms 214, such as to a particular phrase. Alternately or in addition, multiple sets of the known terms 214 may correspond to one of the known-term recordings 216. In such scenarios, however, each set of the known terms 214 may correspond to a particular portion of the one recording, which may be indicated by timestamps, e.g., the portion of the recording corresponding the term "sports car" is associated with timestamp "X".

By presenting a plurality of users with the known terms 214 and recording the sounds those users make in association with the presented terms, the speech recognizer manager module 124 can collect diverse acoustic data. The acoustic data 112 may be diverse insofar as the pitches and cadences of the sounds made by different users may vary when saying a same one of the known terms 214. This diverse-sounding data may be used to build a speech recognizer capable of accurately recognizing a given word despite different pronunciations. The techniques described herein may also improve the accuracy of speech recognizers, because the speech recognizers are generated from words and phrases that are specific to a domain. By using the words and phrases specific to the domain, the speech recognizers can be particularly suited to recognize those particular words and phrases. In other words, the speech recognizer manager module 124 generates the speech recognizers 126 to accurately recognize a subset of words and phrases that are used in a respective domain. This contrasts with attempting to accurately recognize any words and phrases a person might speak.

In any case, the acoustic data 112 is provided to the speech model module 204 to generate the CS acoustic models 132. The speech model module 204 is illustrated with phoneme mapping 218. In accordance with the described techniques, the speech model module 204 is configured to break down the acoustic data 112 into basic sounds and map the basic sounds, which correspond to the known terms 214, to phonemes. In this way, each of the known terms 214 (and ultimately the text of domain-specific terms 208) may be mapped to a list of phonemes. Accordingly, the phoneme mapping 218 maps domain-specific words and phrases represented by the language data 110 to a list of phonemes and is determined using the acoustic data 112.

The speech model module 204 represents functionality to build the CS acoustic models 132 based on the phoneme mapping 218. The speech model module 204 may learn the phoneme mapping 218 through one or more machine learning techniques and produce the CS acoustic models 132 based on the learning. In accordance with one or more implementations, the speech model module 204 may generate the CS acoustic models 132 as deep neural networks (DNN) or other models such as Gaussian Mixture Models (GMMs) and so on. The speech model module 204 also represents functionality to provide the CS acoustic models 132 to the decoding graph module 206.

As noted above, the decoding graph module 206 represents functionality to generate the speech recognizers 126, which as discussed above and below are generated to recognize speech for a specific domain. The decoding graph module 206 may be configured to generate the speech recognizers 126 as decoding graphs, which integrate language models and acoustic models into a unified representation of a search space. It should be appreciated that configurations other than as decoding graphs may alternately be used in one or more implementations. In any case, the decoding graph module 206 uses the DS language models 130 and the CS acoustic models 132 to generate the speech recognizers 126. In particular, for a given domain, the decoding graph module 206 generates a domain-specific speech recognizer from a respective one of the DS language models 130 built for the domain and a respective one of the CS acoustic models 132 built for the domain. In one or more implementations, the decoding graph module 206 may generate the speech recognizers 126 using a DS language model 130 built for the domain and using an acoustic model that leverages open-domain large-scale data rather than one of the CS acoustic models 132 built as described above.

In any case, the decoding graph module 206 is configured to fuse the DS language models 130 with the CS acoustic models 132 (or open-domain large-scale data acoustic model when used) to produce the speech recognizers 126. In general, this fusing combines the ability of the DS language models 130 to predict sequences of words in a respective domain (such as to predict a next most-likely word given a current spoken word or phrase) with the ability of the CS acoustic models 132 to map combinations of speech sounds to particular words of the domain. The combination of these models enables the speech recognizers 126 to be used to calculate probabilities that a spoken phrase corresponds to different sequences of words of a respective domain. The different sequences of words can then be ranked according to the probabilities, such that a sequence of words of the domain with a highest calculated probability (of corresponding to the spoken phrase) is assigned to the spoken phrase.

In order to generate the speech recognizers 126 to be domain-specific, the language models used to generate the speech recognizers 126 are constructed from words and phrases that are actually used in and specific to the domain. To construct the domain-specific language models 130, the words and phrases actually used in and specific to the domain are collected, e.g., the language data 110. FIGS. 3 and 4 illustrate examples of collecting domain-specific language data. By constructing the domain-specific language models 130 in this way, however, the speech recognizers 126 may be less accurate than some techniques if used to recognize words and phrases for a different domain than for which they are constructed.

FIG. 3 illustrates an example 300 in which the domain-specific language data is collected for an application controlled by text-based input. In particular, the illustrated example depicts a scenario in which a user interface 302, configured for an image search service, obtains image search queries as input through a text-based input box 304. The user interface 302 may be displayed via a display of device 306, which may correspond to one of the sources 108. It should be appreciated that such text based components may enable interfaces for a variety of different services or functionality, such as web search engines, help interfaces, website or documentation searching, short message service (SMS) texting, instant messaging, customer support interfaces, social networking functionality (e.g., posts, comments to posts, searches, help), and so forth. Further, these text based components may be replaced or supplemented with voice user interfaces (VUIs).

In general, text queries input to the text-based input box 304 may be saved. For instance, the text queries may be saved as part of an application log for an application, uploaded to a service corresponding to the user interface 302 for saving at storage of the service, and so on. Given this, the text queries may be extracted from the application logs, service storage, and so forth, and configured as the language data 110, which is sent to the VUI generation system 106 to generate the DS language models 130. Accordingly, the text queries may be extracted for text-based interfaces (e.g., the text-based input box 304) that a VUI is being generated to replace or supplement. Not every user interface is controlled using text input, however. Many user interfaces (or components thereof) are instead controlled with non-textual selections made by a user, such as with clicks of a mouse, taps of fingers, and so on. The language data 110 for such interfaces may be collected in different ways than for text-based interfaces and components.

FIG. 4 illustrates an example 400 in which the domain-specific language data is collected for an application interface controlled by non-textual input. For applications or interfaces controlled by non-textual input, application log data may be initially collected from applications to determine actions taken by users with non-textual input. By way of example, application log data may be collected for an image editing application indicating that a user selected options to perform different operations on an image, such as cropping, zooming, filtering, and so forth. The application log data may indicate a state of the application or data of the application before and after the non-textual input. For instance, the application log data of the image editing application may indicate a state of an image before and after input is received for performing an editing operation. In this way, a state of an application before the operation and after the operation can be determined.

Further, a visual representation of the determined states can be generated and displayed. Continuing with the image editing example, a graphical representation of the image before the operation is performed and after the operation is performed can be determined and displayed. In interfaces for other types of applications, other application states can be determined and displayed. For example, in a word-processing application a state of a document before and after changing text formatting can be determined and displayed, in a mapping application a state of a map before and after a navigation input (e.g., zooming) can be determined and displayed, with a news website a state of a displayed web page before and after a navigation input (e.g., selecting a story, menu item, or link within the story) can be determined and displayed, on an entertainment interface of a car a state of the interface before and after an entertainment selection can be determined and displayed, and so on. These are just a few examples of states of applications that may be determined before and after non-textual input is received. Before- and after-states may be determined and displayed for a variety of other types of applications (or interfaces thereof) that are controlled by non-textual input without departing from the spirit or scope of the techniques described herein.

The illustrated example 400 depicts before and after states for an image editing application. In particular, the illustrated example 400 depicts a user interface 402 which displays before state 404 and after state 406. In this example, the before state 404 corresponds to an image before one or more commands are received to perform corresponding operations on the image, e.g., "Image-A". The after state 406 corresponds to the image after the operations are performed on the image, e.g., "Image-B". In accordance with one or more implementations, the language data 110 may be crowd-sourced by asking users to verbally say how they would command an application to achieve the after state 406 from the before state 404, and recording the users' verbal answers. In the illustrated example 400, the user interface 402 prompts users to say how they would produce Image-B (e.g., the after state 406) from Image-A (e.g., the before state 404). Users may be prompted in other ways regarding how they would achieve the after state 406 from the before state 404 for different types of applications.

The vocalized response of the users can then be recorded. In the illustrated example, computing device 408 (which may correspond to one of the sources 108) is illustrated with a microphone 410 capable of recording answers of a user. In the illustrated example, user 412 vocalizes an answer 414 to the prompt displayed on the user interface 402, e.g., indicating how the user would actually say to achieve the after state 406 from the before state 404. The answer 414 is recorded by the microphone 410 and eventually converted into the language data 110 (e.g., text) to use for building a domain-specific language model. With reference to the illustrated example 400, the answer 414 is converted into the language data 110 for an image editing application, and is thus used to build one of the domain-specific language models 130 for the image editing application. In particular, the language data 110, such as text for "crop" and 'zoom,' can be generated for the one or more commands extracted from the image editing application's logs and used to generate the user interface 402. The language data 110 may be collected for other applications controlled by non-textual input in a similar manner, e.g., using before and after states of those applications relative to the non-textual inputs.

Having discussed example details of the techniques for domain-specific speech recognizers, consider now some example procedures to illustrate additional aspects of the techniques.

Example Procedures

This section describes example procedures for domain-specific speech recognizer generation with crowd sourcing in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of a voice user interface generation system 106 (VUI generation system 106) with a speech recognizer manager module 124 or one implemented as the example system 200 of FIG. 2, which also make use of that module.

Figure 5A:
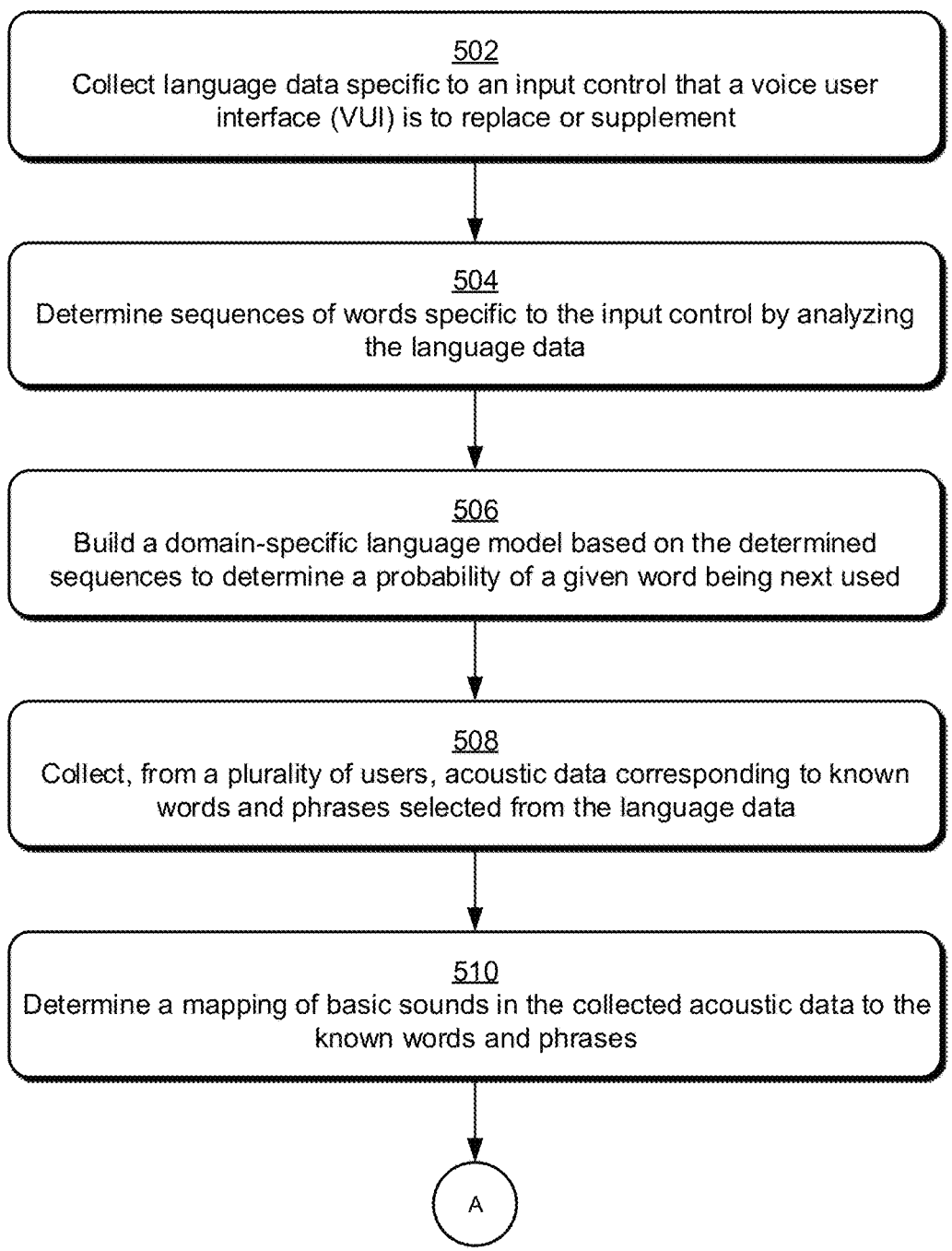
FIGS. 5A and 5B depict a procedure in an example implementation in which a domain-specific speech recognizer is built from domain-specific language data and crowd-sourced acoustic data.
Figure 5B:
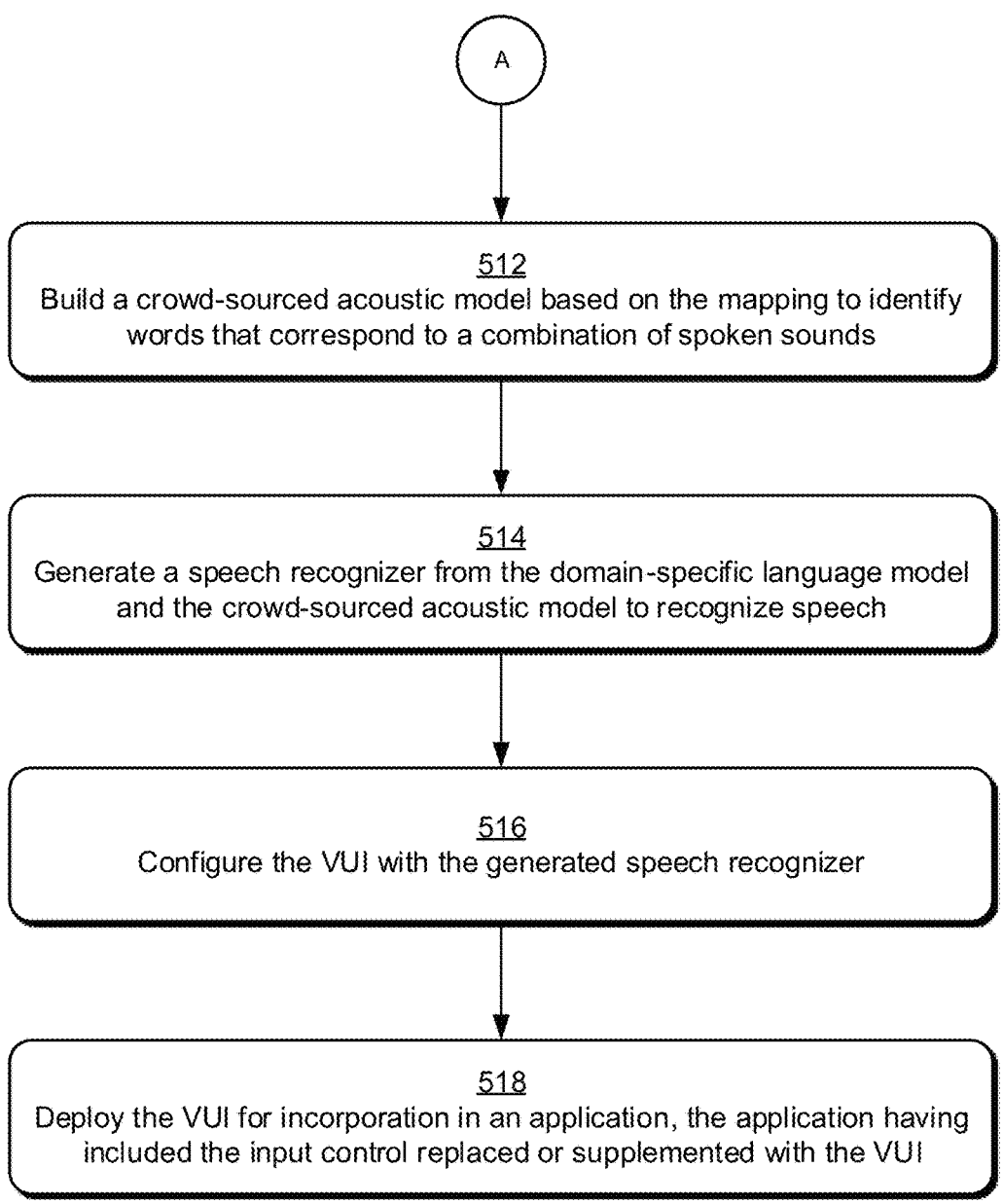

FIGS. 5A and 5B depict an example procedure 500 in which a domain-specific speech recognizer is built from domain-specific language data and crowd-sourced acoustic data. Language data is collected for an input control that a voice user interface (VUI) will replace or supplement (block 502).

For example, the VUI generation system 106 collects the language data 110 from the sources 108. When the input control is driven by text input, the language data may be collected from application logs that store text entered into the input control, as described in relation to FIG. 3. When the input control is non-textually driven, however, the language data 110 may be collected by presenting users with before and after states of an application or content displayed by the application, asking users how they would say the after state can be achieved from the before state, recording the answers of the users, and converting the answers to text, as described in relation to FIG. 4.

Sequences of words that are specific to the input control are determined by analyzing the language data (block 504). For example, the language model module 202 analyzes the text of domain-specific terms 208 from the language data 110 and determines the sequence 210. As noted above and depicted in FIG. 2, the language model module 202 determines the sequence 210 along with other sequences of words from the language data 110. These sequences are specific to an input control, such as the text-based input box 304 of FIG. 3, insofar as the sequences are determined from the language data 110 that corresponds to input for the control, e.g., search queries submitted via the input control and stored in application logs. Further, the sequences represent determined arrangements of words that are likely to occur for the domain relative to which the language data 110 is collected. For instance, with language data collected for an image-searching application, the sequences represent determined arrangements of words that are likely to be entered (and spoken to a VUI) to interact with the image-searching application.

A domain-specific language model is built based on the determined sequences (block 506). In accordance with the principles discussed herein, the domain-specific language model is capable of determining, for a respective domain, a probability of a given word to be next used (e.g., entered or spoken) given a current word or preceding part of a phrase. For example, the language model module 202 builds the DS language models 130 based on the sequences determined at block 504, including based on the sequence 210. As noted above, each of the DS language models 130 is capable of determining, for its respective domain, probabilities of words to be next used (e.g., entered or spoken) given a current word or preceding part of a phrase. With this, the DS language models 130 can determine a next most probable word used for a domain given the current word or the preceding part of a phrase.

Acoustic data is collected from a plurality of users that corresponds to known words and phrases selected from the language data (block 508). For example, the VUI generation system 106 collects the acoustic data 112 from the sources 108. To do so, the VUI generation system 106 can generate the speech collection interface 212 to include the known terms 214. The speech collection interface 212 is then presented (e.g., displayed) with the known terms 214 to users. The speech collection interface 212 may present one set of the known terms 214 to a user at a time, where the set of known terms presented at a given time corresponds to a particular domain. For instance, a first set of the known terms 214 corresponds to an image-searching application, a second set corresponds to an image editing application, a third set corresponds to a vehicle entertainment interface, and so on. Alternately each set of the known terms may correspond to a same domain, such as the image-searching application. Still further, multiple consecutive sets of terms may correspond to a same domain and one or more sets of terms following the multiple consecutive sets may correspond to one or more other domains. Regardless of the correspondence between the terms presented and respective domains, users may vocally say the presented terms, and these vocalizations may be recorded using recording functionality (e.g., microphones). The recordings of the spoken terms can then be digitized by devices of the multiple users to produce the acoustic data 112, which is then communicated to the VUI generation system 106.

A mapping of basic sounds in the collected acoustic data to the known words and phrases is determined (block 510). For example, the speech model module 204 analyzes the acoustic data 112 to determine the phoneme mapping 218. The speech model module 204 determines the phoneme mapping 218, at least in part, by breaking down the acoustic data 112 into basic sounds and maps the basic sounds, which correspond to the known terms 214, to phonemes. As noted above, the phoneme mapping 218 thus maps domain-specific words and phrases represented by the language data 110 to a list of phonemes. The procedure 500 continues at 'A' from FIG. 5A to FIG. 5B.

A crowd-sourced acoustic model is built based on the mapping (block 512). In accordance with the principles discussed herein, the crowd-sourced acoustic model identifies words that correspond to a combination of spoken sounds. For example, the speech model module 204 builds each of the CS acoustic models 132 based on a respective phoneme mapping 218. To do so, the speech model module 204 uses one or more machine learning techniques to build the CS acoustic models 132, such as deep learning to build a CS acoustic model configured as a deep neural network (DNN). The speech model module 204 may utilize other techniques to build the CS acoustic models 132 in accordance with one or more implementations. Further, the CS acoustic models 132 built at block 512 identify words that correspond to a combination of spoken sounds.

A speech recognizer is generated from the domain-specific language model and the crowd-sourced acoustic model to enable a computing device to recognize speech (block 514). By way of example, the decoding graph module 206 generates one of the speech recognizers 126 from one of the DS language models 130 (e.g., the domain-specific language model built at block 506) and one of the CS acoustic models 132 (e.g., the crowd-sourced acoustic model built at block 512). These models are "domain-specific" insofar as they are built using language data collected specifically for an interface that a VUI is to replace or supplement. Further, the speech recognizers 126 are domain-specific because they are generated by fusing respective domain-specific models built for a given speech recognizer. The speech recognizers 126 enable computing devices, such as the client device 104, to recognize speech in the respective domain.

The VUI is configured with the generated speech recognizer (block 516). By way of example, the VUI 120 is configured with the speech recognizer 122, which corresponds to one of the speech recognizers 126. The VUI is deployed for incorporation into an application (block 518). In accordance with the principles discussed herein, the application, at least previously, included the input control that the VUI is configured to replace or supplement. By way of example, the VUI generation system 106 deploys the VUI 120 for incorporation into the application 118. The VUI generation system 106 may deploy the VUI 120 over the network 114 to the client device 104 as an update to the application 118. In this case, the client device 104 may incorporate the VUI 120 into the application 118. In addition or alternately, the VUI generation system 106 may incorporate the VUI 120 into the application 118. Still further, the VUI generation system 106 may communicate the VUI 120 to an application developer, and the application developer may incorporate the VUI 120 into the application 118 or communicate the VUI 120 to the client device 104 as an update to the application 118.

Figure 6:
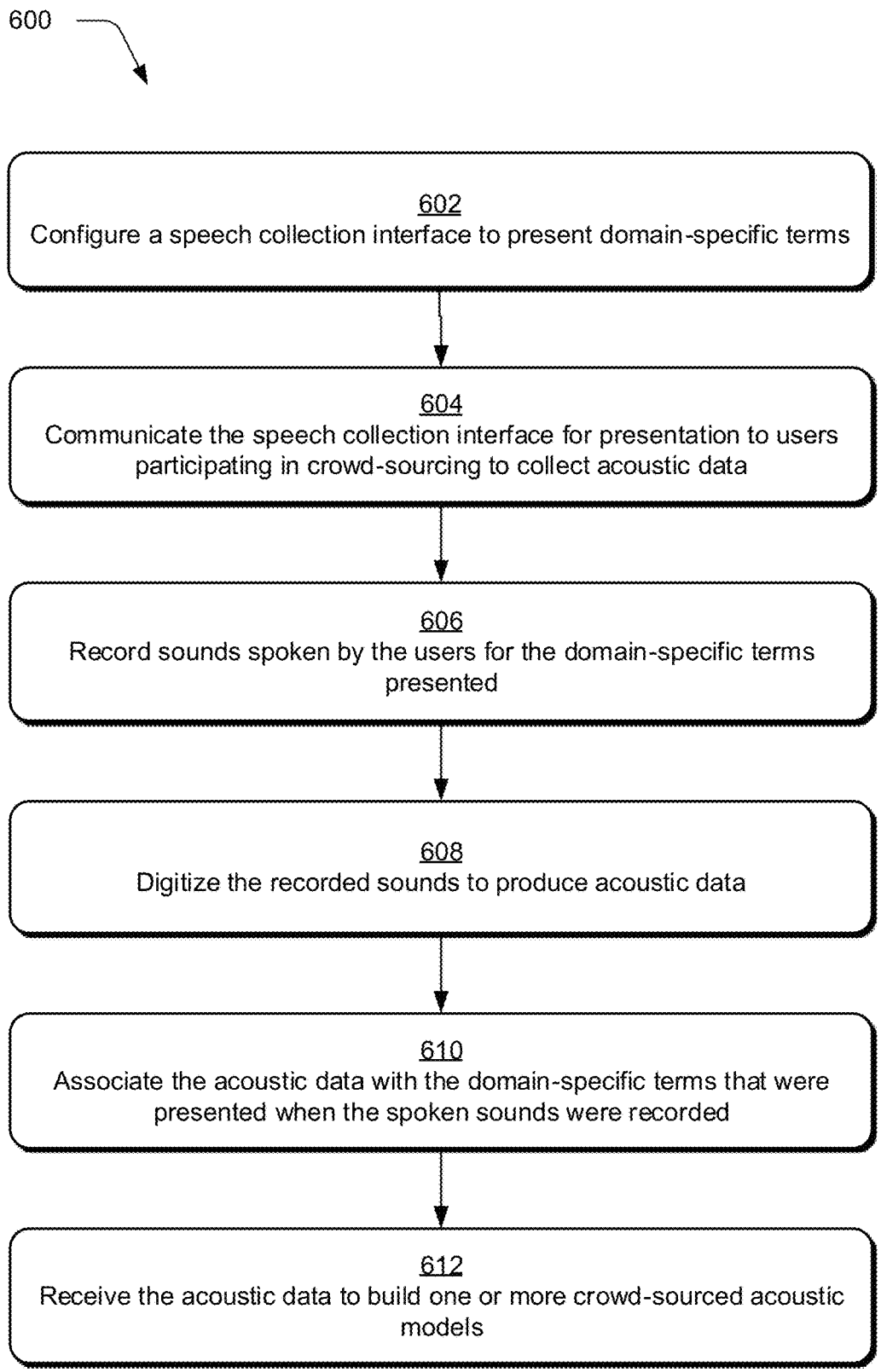
FIG. 6 depicts a procedure in an example implementation in which domain-specific language data and crowd-sourced acoustic data are collected to build a domain-specific speech recognizer.

FIG. 6 depicts an example procedure 600 in which domain-specific language data and crowd-sourced acoustic data are collected to build a domain-specific speech recognizer. A speech collection interface is configured to present domain-specific terms to users participating in crowd-sourcing to collect acoustic data (block 602). By way of example, the speech recognizer manager module 124 configures the speech collection interface 212 to include the known terms 214. Each set of the known terms 214 the speech collection interface 212 is configured to present corresponds to a specific domain as described above.

The speech collection interface is communicated to the users for presentation (block 604). For example, the speech recognizer manager module 124 communicates the speech collection interface 212 over the network 114 to the sources 108. The sources 108 present the speech collection interface 212 to users of the sources 108 to display the known terms 214 to the users.

Sounds spoken by the users are recorded for the domain-specific terms presented to the users (block 606). By way of example, the microphone 410 of the computing device 408 records sounds spoken by the user 412 when the known terms 214 are displayed to the user 412 via the speech collection interface 212.

The recorded sounds are digitized to produce acoustic data (block 608). By way of example, the computing device 408 digitizes the sounds recorded by the microphone 410 to produce the acoustic data 112. In one or more implementations, the acoustic data 112 may be played back to output the recorded sounds. The acoustic data 112 is also capable of being processed according to one or more sound processing techniques, such as to remove silences from the acoustic data 112. One or more sound processing techniques can also be used to analyze the acoustic data 112, e.g., to analyze the acoustic data 112 from different users that corresponds to a same known term and, based on this analysis, determine average sounds or combinations of sounds for that known term.

The acoustic data is associated with the domain-specific terms presented when the spoken sounds were recorded (block 610). For example, the computing device 408 associates one of the known-term recordings 216 with a corresponding one of the known terms 214, e.g., the term that was presented in association with generating the recording. This association may be made by attaching metadata to the acoustic data 112 that is indicative of the presented terms. The association may also correspond to a timestamp for a given term, such that an audio clip for the given term may be found by locating a portion of the recording corresponding to the timestamp.

The acoustic data is received to build one or more crowd-sourced acoustic models (block 612). For example, the VUI generation system 106 may receive the acoustic data 112 from the sources 108, which correspond to users participating in crowd-sourcing the acoustic data 112. From the acoustic data 112, the VUI generation system 106 builds the CS acoustic models 132 as described in more detail above.

Having described example procedures in accordance with one or more implementations, consider now an example system and device that can be utilized to implement the various techniques described herein.

Example System and Device

Figure 7:
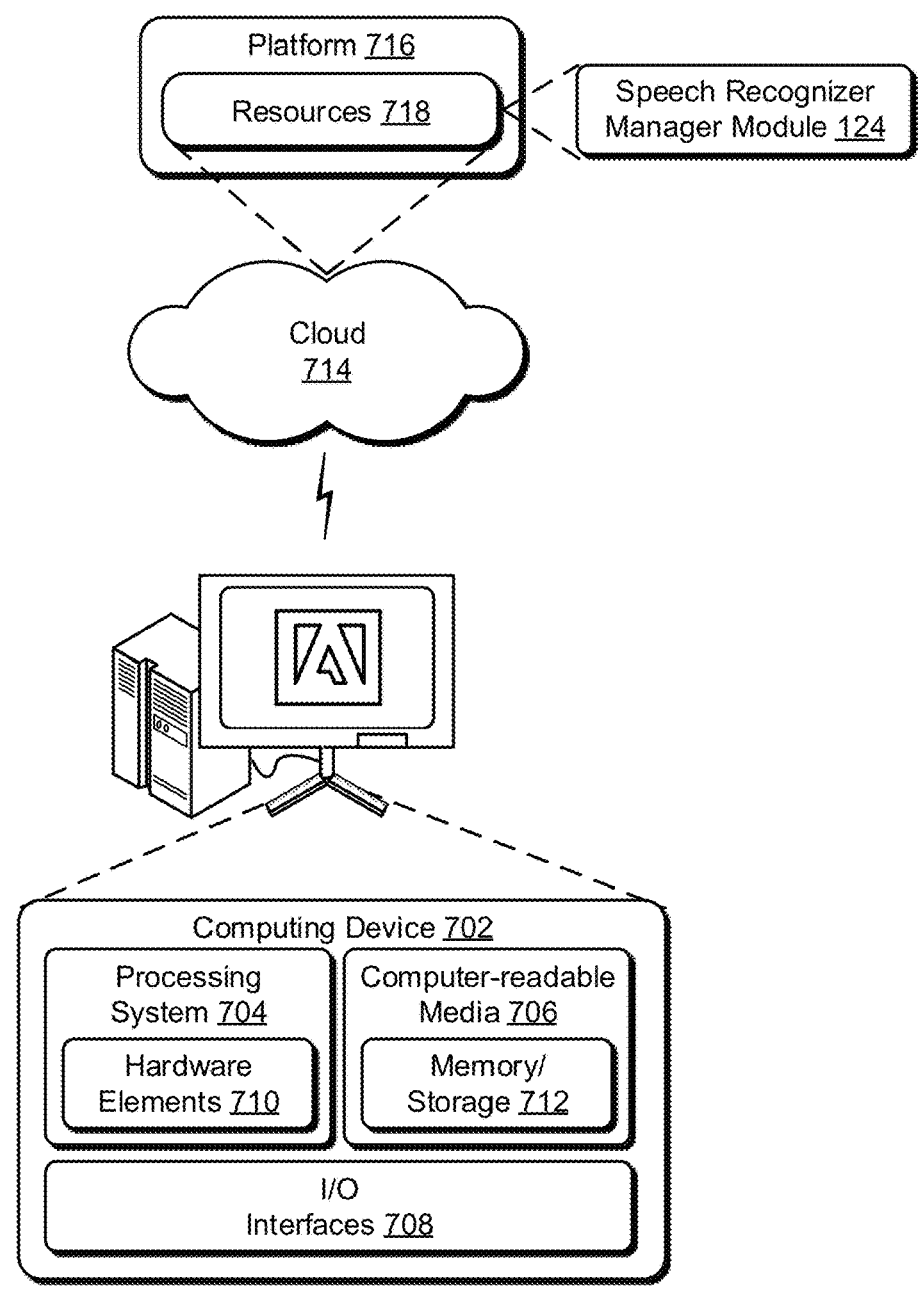
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the speech recognizer manager module 124. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to accurately recognize spoken words and convert the spoken words into a computer-readable format, a method implemented by a computing device, the method comprising:
    collecting, by the computing device, domain-specific language data specific to a domain corresponding to a particular application interface, the domain-specific language data describing a plurality of user inputs received via the particular application interface to control a respective application, the particular application interface driven in part by non-textual user input, and the domain-specific language data collected using language data collection user interfaces generated for collecting the domain-specific language data describing the non-textual user input from a plurality of users;
    determining, by the computing device, sequences of words used in connection with the domain by analyzing the domain-specific language data;
    building, by the computing device, a domain-specific language model based on the sequences, the domain-specific language model indicating probabilities of words to be next used in the domain based on at least one of a current word used or preceding part of a phrase used;
    collecting, by the computing device, acoustic data representing recordings of an additional plurality of users saying selected words represented by the domain-specific language data;
    mapping, by the computing device, basic sounds recorded by the recordings to the selected words;
    building, by the computing device, a crowd-sourced acoustic model based on the mapping, the crowd-sourced acoustic model identifying words from spoken combinations of the basic sounds; and
    generating, by the computing device, a speech recognizer for inclusion in a voice user interface (VUI) by combining the domain-specific language model and the crowd-sourced acoustic model.

2. A method as described in claim 1, wherein the computer-readable format is text.

3. A method as described in claim 1, wherein collecting the domain-specific language data comprises extracting the domain-specific language data from logs of the respective application.

4. A method as described in claim 3, wherein the particular application interface includes a text-input control and the domain-specific language data comprises, in part, text entered into the text-input control.

5. A method as described in claim 4, wherein the text entered into the text-input control comprises a search query for driving a search engine.

6. A method as described in claim 1, wherein collecting the domain-specific language data comprises:
    extracting information from logs of the respective application, extracted information indicating the plurality of user inputs received via the particular application interface, and the extracted information further indicating states of information presented to a user in connection with the respective application;
    determining a before and after state of the information presented relative to the plurality of user inputs;
    generating prompts for prompting the additional plurality of users to describe how to produce the after state from the before state; and
    generating the domain-specific language data based on user responses to the prompts.

7. A method as described in claim 1, wherein the plurality of user inputs received comprise non-textual inputs.

8. A method as described in claim 1, wherein collecting the acoustic data comprises:
    generating prompts for prompting the plurality of users to say the selected words represented by the domain-specific language data;
    causing the prompts to be presented to the plurality of users;
    recording verbalized responses of the plurality of users to the prompts; and
    digitizing the recordings to produce the acoustic data.

9. A method as described in claim 1, wherein the plurality of users are participants in a crowd-sourcing effort to generate crowd-sourced acoustic models.

10. A method as described in claim 1, wherein building the crowd-sourced acoustic model includes learning the mapping of the basic sounds to the selected words using machine learning.

11. A method as described in claim 10, wherein the machine learning builds the crowd-sourced acoustic model as a deep neural network (DNN).

12. A method as described in claim 10, wherein generating the speech recognizer includes fusing the domain-specific language model and the crowd-sourced acoustic model into a unified representation of a search space searchable to recognize words spoken to the VUI.

13. A method as described in claim 1, wherein the voice user interface is used for image editing operations of at least one of cropping, filtering, and zooming.

14. A system implemented in a digital medium environment to enable voice user interfaces (VUIs) to accurately recognize spoken words and convert the spoken words into a computer-readable format, the system comprising:
at least one processor; and
memory having stored thereon computer-readable instructions that are executable by the at least one processor to implement a speech recognizer manager to perform operations comprising:
generating a speech recognizer for a particular application interface by combining a domain-specific language model and a crowd-sourced acoustic model, the domain-specific language model built from language data describing a plurality of user inputs received via the particular application interface to control a respective application, the particular application interface driven in part by non-textual user input and the domain-specific language model built based on language data collection user interfaces generated for collecting the language data describing the non-textual input from a plurality of users, and the crowd-sourced acoustic model built from acoustic data representing recordings of an additional plurality of users saying selected words represented by the language data;
incorporating the speech recognizer into a VUI to replace or supplement the particular application interface in the respective application; and
deploying the VUI to enable a user to interact with the respective application on at least one client device.

15. A system as described in claim 14, wherein generating the speech recognizer includes fusing the domain-specific language model and the crowd-sourced acoustic model into a unified representation of a search space searchable to recognize words spoken by the user.

16. A system as described in claim 14, wherein the operations further comprise extracting the language data from logs of the respective application.

17. A system as described in claim 14, wherein the operations further comprise generating speech collection user interfaces for collecting the acoustic data from the additional plurality of users, the speech collection user interfaces configured to present the selected words to the plurality of users and prompt the plurality of users to say the selected words for recording.

18. In a digital medium environment to accurately recognize spoken words and convert the spoken words into a computer-readable format, a method implemented by a computing device, the method comprising:
receiving, by the computing device, an audio signal indicative of speech;
computing, by the computing device, probabilities that the speech corresponds to different sequences of words using a speech recognizer generated from a domain-specific language model and an acoustic model, the domain-specific language model built from language data collected for a domain corresponding to a particular application interface, the language data describing a plurality of user inputs received via the particular application interface to control a respective application, the particular application interface driven in part by non-textual user input, and the domain-specific language data collected using language data collection user interfaces generated for collecting the domain-specific language data describing the non-textual input from a plurality of users;
identifying, by the computing device, a sequence of words having a highest computed probability of corresponding to the speech; and
converting, by the computing device, the identified sequence of words into a machine-readable format for driving operation of the computing device.

19. A method as described in claim 18, further comprising receiving the audio signal from an audio file.

20. A method as described in claim 18, further comprising receiving the audio signal from a microphone.

* * * * *